US012109770B2

(12) United States Patent
Kastner et al.

(10) Patent No.: US 12,109,770 B2
(45) Date of Patent: Oct. 8, 2024

(54) METHOD FOR MANUFACTURING A SPECTACLE LENS

(71) Applicant: Carl Zeiss Vision International GmbH, Aalen (DE)

(72) Inventors: Maximilian Kastner, Aalen (DE); Michel-René Christmann, Aalen (DE); Andreu Llobera Adan, Cerdanyola del Vallès (ES)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/304,451

(22) Filed: Apr. 21, 2023

(65) Prior Publication Data

US 2023/0256692 A1    Aug. 17, 2023

Related U.S. Application Data

(63) Continuation of application No. PCT/EP2021/079534, filed on Oct. 25, 2021.

(30) Foreign Application Priority Data

Oct. 23, 2020   (EP) .................................... 20203734

(51) Int. Cl.
*B29D 11/00* (2006.01)
*G02C 7/02* (2006.01)

(52) U.S. Cl.
CPC .. *B29D 11/00326* (2013.01); *B29D 11/00442* (2013.01); *B29D 11/00865* (2013.01); *G02C 7/022* (2013.01); *G02C 2202/24* (2013.01)

(58) Field of Classification Search
CPC ................ B05D 3/12; B29D 11/00326; B29D 11/00865; G02C 7/022; B29C 2059/023; G01Q 80/00; G03F 7/0002
See application file for complete search history.

(56) References Cited

U.S. PATENT DOCUMENTS

| | | | |
|---|---|---|---|
| 5,316,791 A | 5/1994 | Farber et al. | |
| 10,502,963 B1 | 12/2019 | Noble et al. | |
| 2002/0111390 A1 | 8/2002 | Lin et al. | |
| 2002/0158354 A1 | 10/2002 | Foreman et al. | |
| 2004/0026832 A1* | 2/2004 | Gier .......................... | B05D 3/12 264/293 |
| 2005/0171231 A1 | 8/2005 | Diggins | |
| 2008/0316558 A1 | 12/2008 | Defranco | |
| 2009/0001620 A1 | 1/2009 | Forrest | |
| 2009/0043279 A1* | 2/2009 | Kaspar ................. | A61K 9/0021 604/506 |
| 2009/0189303 A1 | 7/2009 | Diggins et al. | |
| 2013/0278892 A1 | 10/2013 | Jiang et al. | |
| 2014/0099439 A1 | 4/2014 | Okubo et al. | |
| 2015/0160477 A1 | 6/2015 | Dai | |
| 2015/0276987 A1 | 10/2015 | McKenzie et al. | |
| 2015/0277144 A1 | 10/2015 | Trumm et al. | |
| 2016/0124122 A1 | 5/2016 | Duc et al. | |
| 2017/0013167 A1 | 1/2017 | Saga | |
| 2017/0131567 A1 | 5/2017 | To et al. | |
| 2019/0212580 A1 | 7/2019 | To et al. | |
| 2019/0310492 A1 | 10/2019 | Gromotka | |
| 2020/0159044 A1 | 5/2020 | To et al. | |

FOREIGN PATENT DOCUMENTS

| | | |
|---|---|---|
| CN | 101326058 A | 12/2008 |
| CN | 103298603 A | 9/2013 |
| CN | 105264406 A | 1/2016 |
| CN | 106164753 A | 11/2016 |
| EP | 1433814 A1 | 6/2004 |
| EP | 1561571 A1 | 8/2005 |
| EP | 1602479 A1 | 12/2005 |
| EP | 2578649 A1 | 4/2013 |
| EP | 2682807 A1 | 1/2014 |
| EP | 3339940 A1 | 6/2018 |
| EP | 3531195 A1 | 8/2019 |
| EP | 3812142 A1 | 4/2021 |
| EP | 3928966 A1 | 12/2021 |
| JP | 2003527231 A | 9/2003 |

(Continued)

OTHER PUBLICATIONS

B. A. Holden et al., "Global Vision Impairment Due to Uncorrected Presbyopia," Arch. Ophthalmol., vol. 126, No. 12, pp. 1731-1739, Dec. 2008.
World Health Organization (WHO), "Universal eye health: a global action plan 2014-2019", pp. 1-22, 2013.
C. S. Y. Lam et al., "Defocus Incorporated Multiple Segments (DIMS) spectacle lenses slow myopia progression: a 2-year randomised clinical trial," Br J Ophthalmol., vol. 104, No. 3, pp. 363-368, May 2019.
Industrial Norm "Ophthalmic optics—Spectacle lenses—Vocabulary (ISO 13666:2019)," English version EN ISO ISO 13666:2019, Dec. 2019.

(Continued)

*Primary Examiner* — Alex A Rolland
(74) *Attorney, Agent, or Firm* — Tautz & Schuhmacher LLC; Georg Hasselmann

(57) ABSTRACT

A method for manufacturing a spectacle lens including a lens substrate and at least one coating is disclosed. The method includes at least the following steps of providing a lens substrate comprising an uncoated or precoated front surface and an uncoated or precoated back surface, covering at least one of the surfaces of the lens substrate partially or completely with at least one coating composition, drying and/or precuring the at least one coating composition, contacting the surface of the at least one coating composition with at least one mechanical means, curing and/or hardening the at least one coating composition and obtaining a spectacle lens comprising a lens substrate and at least one coating, the surface topography of the at least one coating being modified by the at least one mechanical means.

22 Claims, No Drawings

(56) References Cited

FOREIGN PATENT DOCUMENTS

| | | | |
|---|---|---|---|
| JP | 2023527231 | A | 9/2003 |
| JP | 2012137636 | A | 7/2012 |
| WO | 9739880 | A2 | 10/1997 |
| WO | 9906887 | A1 | 2/1999 |
| WO | 0018569 | A2 | 4/2000 |
| WO | 0056527 | A1 | 9/2000 |
| WO | 0194104 | A2 | 12/2001 |
| WO | 03058300 | A1 | 7/2003 |
| WO | 03078145 | A2 | 9/2003 |
| WO | 2006034652 | A1 | 4/2006 |
| WO | 2006135390 | A2 | 12/2006 |
| WO | 2007066006 | A2 | 6/2007 |
| WO | 2007070976 | A1 | 7/2007 |
| WO | 2008049503 | A2 | 5/2008 |
| WO | 2010075319 | A1 | 7/2010 |
| WO | 2018026697 | A1 | 2/2018 |
| WO | 2019166653 | A1 | 9/2019 |
| WO | 2019166654 | A1 | 9/2019 |
| WO | 2019166655 | A1 | 9/2019 |
| WO | 2019166657 | A1 | 9/2019 |
| WO | 2019166659 | A1 | 9/2019 |
| WO | 2019206569 | A1 | 10/2019 |
| WO | 2020018127 | A1 | 1/2020 |
| WO | 2020078693 | A1 | 4/2020 |
| WO | WO-2020078964 A1 * | 4/2020 | ....... B29D 11/00009 |

OTHER PUBLICATIONS

K. G. Foote et al.,|Ultra-widefield peripheral refraction using a slit-scanning ophthalmoscope and image montaging|, Investigative Ophthalmology & Visual Science, vol. 61, Jul. 2020.

European Search Report issued in EP 20 203 734.7 to which this application claims priority, mailed May 4, 2021.

International Search Report and Written Opinion issued in PCT/EP2021/079534, to which this application claims priority, mailed Apr. 14, 2022.

International Preliminary Report on Patentability issued in PCT/EP2021/079534, to which this application claims priority, mailed Jan. 31, 2023.

Office Action by the Japanese Patent Office issued in JP 2023-524738, which is a counterpart hereof, mailed on Dec. 26, 2023, and English-language translation thereof.

Office Action by the Chinese Patent Office issued in CN 202180072148.4, which is a counterpart hereof, mailed on Sep. 13, 2023, and English translation thereof.

Office Action by the Japanese Patent Office issued in JP 202010472922.8 which is a counterpart hereof, mailed on Sep. 19, 2023, and English translation thereof.

Office Action by the Chinese Patent Office issued in CN202180072148.4, which is a counterpart hereof, mailed on May 17, 2024, and English-language translation thereof.

* cited by examiner

METHOD FOR MANUFACTURING A SPECTACLE LENS

CROSS REFERENCE TO RELATED APPLICATIONS

This application is a continuation application of international patent application PCT/EP2021/079534, filed on Oct. 25, 2021 and designating the U.S., which claims priority to European patent application EP 20 203 734.7, filed on Oct. 23, 2020, both of which are hereby incorporated by reference in their entireties.

TECHNICAL FIELD

The disclosure relates to a method for manufacturing a spectacle lens.

BACKGROUND

According to Brien A. Holden et al., "Global Vision Impairment Due to Uncorrected Presbyopia," Arch Ophthalmol. 2008; 126(12):1731-1739, uncorrected distance refractive error is the most common cause of vision impairment. In "Universal eye health: a global action plan 2014-2019," World Health Organization 2013, the WHO estimates that in 2010 285 million people were visually impaired. C. S. Y. Lam et al., "Defocus Incorporated Multiple Segments (DIMS) spectacle lenses slow myopia progression: a 2-year randomised clinical trial," Br J Ophthalmol 2019;0:1-6, tested in a study with children Defocus Incorporated Multiple Segments (DIMS) spectacle lenses, also disclosed for example in U.S. 2017/0131567 A1, U.S. 2019/0212580 A1 or U.S. 2020/0159044 A1, which should impose myopic defocus. The DIMS spectacle lenses were shown to retard myopia progression and axial elongation in myopic children.

U.S. 2017/0131567 A1 discloses a spectacle lens comprising a first refraction area having a first refractive power based on a prescription for correcting an abnormal refraction of an eye and second refraction areas having the function of focusing an image on a position other than the retina of the eye to suppress a progress of the abnormal refraction of the eye. The second refraction areas are formed as a plurality of independent island-shaped areas.

U.S. 2019/0212580 A1 discloses a spectacle lens comprising a first refraction area and second refraction areas as disclosed in U.S. 2017/013167 A1. The second refraction areas according to U.S. 2019/0212580 A1 are dispersedly arranged as a plurality of mutually separate areas, each of their second refraction areas being surrounded by the first refraction area.

U.S. 2020/0159044 A1 discloses a first spectacle lens comprising a first refraction area having refractive power based on a prescription for correcting myopia and second refraction areas having a refractive power different from the first refractive power. Each of the second refraction areas is formed into a convex shape that extends from an object side surface of the spectacle lens. Each of the second refraction areas has a larger curvature than the object side surface of the first refraction area. The second refraction areas comprise a plurality of refraction areas having a plurality of refractive powers different from each other. U.S. 2020/0159044 A1 further discloses a second spectacle lens comprising a first refraction area based on a prescription for correcting myopia and second refraction areas having a refractive power different from the first refractive power. The second refraction areas of the second spectacle lens are non-concentrically formed as a plurality of island-shaped areas, the refractive power of the second refraction areas is larger than the first refractive power of the first refraction area by 2.00D to 5.00D. U.S. 2020/0159044 A1 further discloses a third spectacle lens comprising a first refraction area having a first refractive power based on a prescription for correcting an abnormal refraction of an eye and second refraction areas having a refractive power different from the first refractive power. The second refraction areas of the third spectacle lens are non-concentrically formed as a plurality of island-shaped areas arranged to form a hexagon inscribed in a circle having a predetermined radius.

U.S. 2015/0160477 A1 discloses a multi-element lens for controlling defocus and eye diopter dividing the lens into a lens area corresponding to the central view region of the eye and a convex lens area corresponding to the equatorial view region of the eye. The multi-element lens comprises a large unit convex lens generating a large defocus, a small unit concave lens generating small defocus or focus through combination on the large unit convex lens, or a small single lens generating small defocus is separately provided on the large unit convex lens. The junction between the large unit concave lens and the small unit concave lens or the small single lens is a gradual zoom structure or step zoom structure. U.S. 2015/0160477 A1 also discloses on the large unit convex lens a subunit concave lens or a medium single lens, each combination generating medium defocus through combination with the lens of the large unit convex lens. The subunit concave lens or the medium single lens is disposed on the outer ring of the small unit concave lens or the small single lens and is ring-like.

WO 2018/026697 A1 discloses ophthalmic lenses for treating myopia. The lenses include a dot pattern distributed across each lens, the dot pattern including an array of dots spaced apart by a distance of 1 mm or less, each dot having a maximum dimension of 0.3 mm or less. The dots may be arranged on a square grid, a hexagonal grid, another grid, or in a semi-random or random pattern. The dots may be spaced at regular intervals or the dot spacing may vary depending on the distance of the dot from the center of the lens. The dot pattern can include a clear aperture free of dots having a maximum dimension of more than 1 mm, the clear aperture being aligned with a viewing axis of a wearer of the pair of glasses. The clear aperture can be substantially circular or a similar shape. The dots may be protrusions or recesses on a surface of the corresponding lens. The protrusions can be formed from a transparent material. For manufacturing the protrusions, discrete portions of a material are deposited, e.g., by using an inkjet printer, on a surface of the lens corresponding to the dot pattern. The discrete portions provide the protrusions after curing, e.g., using radiation. The dot pattern can reduce an image contrast of an object viewed through the dot pattern by at least 30% compared to an image contrast of the object viewed through the clear aperture. According to WO 2018/026697 A1 the pair of eyeglasses is customized for a wearer, inter alia the lenses thereby having optical power to correct the wearer's on-axis vision to 20/20 or better, the lenses including a dot pattern distributed across each lens, the dot pattern including an array of dots arranged so that, for at least a portion of the wearer's peripheral vision, the lenses correct the wearer's vision to 20/25 or better and reduce an image contrast by at least 30% compared to on-axis image contrast.

WO 2006/034652 A1 discloses a method for treating progression of a refractive disorder in a human eye, in particular a method for counteracting the development of myopia by enhancing myopic defocus and a method for counteracting the development of hyperopia by enhancing of hyperopic defocus. The method includes producing a first image on a retina of the human eye and producing a second image to generate a defocus. To alter the defocus equilibrium of the eye should influence axial eye growth in a direction towards emmetropia. This artificial shift may be introduced by a spectacle lens, preferably together with the conventional correction so that normal vision can be maintained. The spectacle lens may be a Fresnel lens or a central-peripheral multi-focal lens including concentric optical zones of two or more optical powers.

WO 2010/075319 A2 discloses a therapeutic treatment method for preventing, ameliorating, or reversing eye-length related disorders. An artificial blurring of the patient's vision is induced to decrease an average spatial frequency of images input to the retina of the eye past a threshold spatial frequency to inhibit further lengthening of the eye. For inducing artificial blurring, blur-inducing glasses may be used. The blur-inducing glasses induces the burring by small bumps or depressions in one or both surfaces of the lenses, inclusions within the lenses of a material different from the lens material, incorporation of higher-level aberrations in the lenses, including higher-level aberrations that more greatly affect peripheral vision, providing progressive negative corrections in one or both lenses from the top of the lenses to the bottom of the lenses, coatings or films applied to one or both surfaces of the lenses. Decreasing for example the density of bumps or depressions in the central region of the lens facilitates relatively normal image acquisition for portions of scenes axially aligned with the axis of the eye, while increasingly blurring the portions of scenes that are not aligned with the optical axis. The amount of artificial blurring can be controlled by varying the density or the dimensions of the bumps or depressions, for example.

WO 2019/166653 A1 discloses a lens element comprising a refraction area having a refractive power based on a prescription for an eye of a person and a plurality of at least three non-contiguous optical elements with at least one optical element having a non-spherical optical function. At least one of the non-contiguous optical elements may be for example a multifocal refractive micro-lens, made of a birefringent material, a diffractive lens or has a shape configured to create a caustic in front of the retina of the eye of the person.

WO 2019/16654 A1 discloses a lens element comprising a refraction area having a first refractive power based on a prescription for correcting an abnormal refraction of an eye of a person, a second refractive power different from the first refractive power and a plurality of at least three optical elements with at least one optical element having an optical function of not focusing an image on the retina of the eye so as to slow down the progression of the abnormal refraction of the eye. The difference between the first refractive power and the second refractive power may be greater or equal to 0.5D.

WO 2019/166655 A1 discloses a lens element comprising a refraction area having a refractive power based on a prescription for an eye of a person and a plurality of at least three optical elements. The optical elements are configured so that along at least one section of the lens the mean sphere of optical elements increases from a point of said section towards the peripheral part of said section. The optical elements may be configured so that along at least one section of the lens the mean cylinder of the optical elements increases from a point of said section towards the peripheral part of said section.

WO 2019/166657 A1 discloses a lens element comprising a prescription portion configured to provide to a wearer in standard wearing conditions and for foveal vision a first optical power based on the prescription of the wearer for correcting an abnormal refraction of an eye of the wearer and a plurality of at least three optical elements with at least one optical element having an optical function of not focusing an image on the retina of the eye in standard wearing conditions and for peripheral vision so as to slow down the progression of the abnormal refraction of the eye. At least one of the optical elements may have an optical function of focusing an image on a position other than the retina in standard wearing conditions and for peripheral vision.

WO 2019/166659 A1 discloses a lens element comprising a refraction area having a refractive power based on a prescription for an eye of a wearer and a plurality of at least two contiguous optical elements with at least one optical element having an optical function of not focusing an image on the retina of the eye of the wearer so as to slow down the progression of the abnormal refraction of the eye. Having contiguous optical elements improves according to WO 2019/166659 A1 the aestheticism of the lens element and limits the discontinuity degree of the lens element surface. At least two contiguous optical elements may be independent.

WO 2019/206569 A1 discloses a lens element comprising a prescription portion configured to provide to a wearer in standard wearing conditions a first optical function based on the prescription of the wearer for correcting an abnormal refraction of an eye of the wearer and a plurality of contiguous optical elements. Each optical element has a simultaneously bifocal optical function that provides simultaneously a second optical function in standard wearing conditions and a third optical function of not focusing an image on the retina of the eye in said standard wearing conditions so as to slow down the progression of the abnormal refraction of the eye. Having a plurality of contiguous optical elements that provide simultaneously a second and third optical function, allows according to WO 2019/206569 A1 having an easy to configure lens element that reduces the progression of abnormal refraction of the eye such as myopia or hyperopia by having part of the light focused on the retina of the wearer and part of the light focused either in front or behind the retina of the wearer. Further, the lens element allows selecting the part of the light that is to be focused on the retina and the part of the light that is not to be focused on the retina of the eye. WO 2019/026569 A1 also discloses a method for providing a lens element which comprises providing a lens member configured to provide to the wearer in standard wearing conditions a first refractive power based on the prescription for the wearer for correcting an abnormal refraction of the eye of the wearer, providing an optical patch comprising a plurality of contiguous optical elements and forming a lens element by placing the optical patch on one of the front or back surface of the lens member. Alternatively, the method comprises casting the lens element and during the casting providing an optical patch comprising a plurality of contiguous optical elements.

EP 3 531 195 A1 discloses a spectacle lens comprising a nanostructured and/or micro structured coating. For obtaining the nanostructured and/or micro structured coating, in a first step at least one surface of the uncoated or precoated lens substrate is covered with a layer of nanoparticles and/or microparticles masking the respective uncoated or precoated surface of the lens substrate. In a second step at least one coating is applied to the layer of nanoparticles and/or microparticles. Thereby the at least one coating covers the nanoparticles and/or microparticles as well as the respective uncoated or precoated surface of the lens substrate in the intermediate spaces between the nanoparticles and/or microparticles. In a third step the nanoparticles and/or microparticles are removed and a nanostructured and/or microstructured coating remains on the respective uncoated or precoated surface of the lens substrate.

EP 2 682 807 A1 discloses a method for forming a mark on a surface of a spectacle lens by either applying an additional transparent coating at the desired position of the coating, by including a masking layer having an aperture at a desired position, both the masking layer and the aperture to be overcoated by the coating of the spectacle lens only or by tinting the lens substrate in a desired position. In case an additional transparent coating should be applied, in a first step a masking layer having an aperture is applied to the uncoated or precoated surface of the lens substrate to be marked. In a second step a transparent coating is applied to the masking layer as well as to the respective uncoated or precoated surface via the aperture of the masking layer. In a third step the masking layer and the transparent coating on top of the masking layer are removed, thereby the transparent coating remaining on top of the respective uncoated or precoated surface. Thereafter the transparent coating is overcoated with the coating of the spectacle lens, for example with a multilayer antireflective coating, parts of a multilayer reflective coating and a water repellant layer, thus resulting in the visible mark. The mark may constitute an ornamental pattern, logo, character which can be viewed due to differences in the light reflection thereby ensuring the field of vision of the wearer without discomfort.

EP 3 339 940 A1 discloses a method for applying a coating on an uncoated or precoated surface of a lens substrate via a masking layer to ensure that for example a logo is visible due to the difference of the refractive index of the coating applied with and without masking layer.

WO 2007/066006 A2 discloses a method of transferring a micro-scale pattern onto a surface of an optical article. Therefore, a layer of transferable material is deposited on a surface of a stamp having recesses and protuberances constituting micro-relief corresponding to the pattern to be transferred by contacting the stamp with a not yet dried layer of a latex being deposited on the surface of a substrate of the optical article. Depending on the pressure applied to the stamp the layer of transferable material applied to the protuberances only or the layer of transferable material applied to the recesses and the protuberances is transferred into the layer of latex. After the transfer the stamp is removed.

US 2002/0158354 A1 discloses a method for making photochromic, ultraviolet/visible light absorbing, and colored plastic lenses by curing the lens forming composition using activating light. As activating light source an ultraviolet light source, an actinic light source, a visible light source and/or an infra-red light source may be used. The lens forming material may include any suitable liquid monomer and any suitable photosensitive initiator. The lens curing unit comprises a controller which inter alia determines the initial dose of light in pulsed curing applications required to cure the lens forming material, applies the activating light with an intensity and duration sufficient to equal the determined dose and calculates the dose required for the next application of activating light in pulsed curing applications. Instead of pulsed activated light curing sequences continuous activating light sequences may be used. In the latter case, equipment for generating light pulses is not required, thus reducing the cost of the lens curing apparatus.

WO 97/39880 A2 discloses the formation of an eyeglass lens by placing a liquid, polymerizable lens forming composition in a mold cavity, applying a plurality of high intensity light pulses to the lens forming composition and curing the lens forming composition to form a substantially clear eyeglass lens in a time period of less than 30 minutes. The pulses preferably emanating from a flash source of light, i.e., a flash light, such as a xenon light source, have a sufficiently high intensity such that reaction is initiated in substantially all the lens forming composition that is exposed to pulses in the mold cavity. According to WO 97/39880 A2, one advantage of pulsed light application via flash lights is that even though higher intensities of light are applied, because the duration of pulses is so short the total amount of light energy applied to cure the lens forming composition is lessened. According to WO 97/39880 A2, a further significant advantage is that relatively high-mass, semi-finished lens blanks and high power cast-to-finish lenses may be produced without prematurely releasing from the mold cavity and without cracking. By interrupting or decreasing the activating light at the proper time during the cycle, the rate of heat generation and release can be controlled, and the incidence of premature release can be reduced. According to WO 97/39880 A2, the curing of a lens forming composition comprising a photoinitiator absorbing ultraviolet light having a wavelength in the range of 300 to 400 nm is possible as well as the curing of a coating composition each curable upon exposure to UV light and each comprising a photoinitiator forming a substantially clear combination coat.

WO 00/18569 A2 discloses the curing of a polymerizable lens forming composition being placed in a mold/gasket assembly and continuously exposing said composition to pulsed activating light. A flash lamp, for example a xenon light source, may be used to emit the activating light pulses. Colored lenses, photochromic lenses, ultraviolet/light absorbing colorless lenses, and clear lenses may be formed, the latter by adding a colorless, non-photochromic ultraviolet/visible light absorbing compound to the lens forming composition. By adding the ultraviolet/visible light absorbers to the lens forming composition, the curing of the clear lens composition under the more intense dosing requirements to be used for the curing of a photochromic lens composition is possible. Moreover, the formed clear lens may offer better protection against ultraviolet/visible light rays than a clear lens formed without such compounds. Further, WO 00/18569 A2 discloses an in-mold method for forming a scratch resistant coating or a tint coating over the lens. Alternatively, the lens may be tinted, or a scratch resistant coating may be applied to the lens after the lens has been demolded. The scratch resistant coating is then cured by applying activating light rays to this face of the lens. The lens forming composition as well as the coating may include a photosensitive initiator.

WO 2006/135390 A2 discloses the curing of a coating composition of a spectacle lens and of the uncoated spectacle each using pulses of activating light. The coatings such as hardcoat coatings, antireflective coatings, or photochromic coatings may be cured in an in-mold or in an out-of-mold process. Exemplarily, a spectacle lens comprising a hardcoat coating and an antireflective coating manufactured by an in-mold process is described, wherein the mold with the coatings was exposed to flashes from a strobe lamp.

WO 01/94104 A2 discloses the use of ultraviolet light curable liquid compositions for forming antireflective coatings on visible light transmitting spectacle lenses. The antireflective coatings may be formed in an-mold or in an out-of-mold process. A hardcoat composition may be applied prior to the application of the antireflective coating. The ultraviolet light may be produced by a flash lamp. Light pulses may be used to affect the curing of the coating compositions.

WO 03/078145 A2 discloses an in-mold process for manufacturing a coated spectacle lens. Therefore, the casting face of the front mold member may be coated with one or more hardcoat layers before the lens forming composition is placed within the mold cavity. If two hard coat layers are used, any imperfections, such as pin holes in the first hardcoat layer are covered by the second hardcoat layer. The spectacle lens may be further coated with an antireflective coating, either in an in-mold process or in an out-of-mold process. Activating light including ultraviolet light, actinic light, visible light or infrared light may be applied to the coating composition to initiate curing of the coating composition. As activating light sources germicidal lamps, mercury vapor lamps, halide lamps and/or strobe lamps may be used. By using a strobe lamp as activation light source, less heat between process runs is produced, the activating light dosage may be controlled by controlling the intensity of light applied, the frequency of activating light flashes, the duration of activating light flashed and/or the number of activating light flashes. The lens forming material may include a photoinitiator that interacts with activating light.

WO 00/56527 A1 discloses a lens forming composition for making photochromic, ultraviolet/visible light absorbing colorless, and colored plastic lenses by curing the lens forming composition in an in-mold process with pulses of activating light. Activating light being able to affect a chemical change, e.g., to cause a polymerization to take place, may include ultraviolet light, actinic light, visible light or infrared light. A flash lamp may be used to emit activating light pulses to cure the lens forming material or to cure a lens coating. By placing a liquid coating in the mold and subsequently curing it may result in a lens having a hard coat on a surface. The flash lamp may be a xenon light source. The relatively high intensity of the xenon flash lamp and short pulse duration may allow rapid curing of the lens forming composition without imparting significant radiative heat to the composition. The xenon flash lamp is used to apply a plurality of activating light pulses to the lens forming composition to cure it to an eyeglass lens in a time period of less than 30 minutes. Due to the relatively high intensity attainable with the xenon flash lamp a deeper penetration into and/or saturation of the lens forming composition may be allowed, thereby allowing uniform curing of thicker lenses than conventional radiation-initiated curing.

WO 99/06887 A1 discloses an in-mold process to form a spectacle lens by applying a plurality of activating light pulses to the lens forming composition. The pulses may emanate from a flash light such as a xenon light source. The flash lamp may also be used to cure a lens coating. WO 99/06887 A1 further discloses an in-mold process for forming a scratch resistant coating by placing a first coating composition within a mold member, distributing the first coating composition over the casting face of the mold member, directing activating light at the mold member to cure at least a portion of the first coating composition, placing a second coating composition within the mold, the first and the second coating composition comprising each a photoinitiator, distributing the second coating composition over the first coating composition, directing activating light at the mold member to cure at least a portion of the second coating composition and to form a substantially clear combination coat, assembling the mold member with a second mold member, placing a lens forming composition comprising a photoinitiator in the cavity and directing activating light at the mold to cure at least a portion of the lens forming material to form a coated spectacle lens. Alternatively, the spectacle lens may be demolded and then tinted, or a scratch resistant coating may be applied to the lens. The lens forming composition may contain activating light absorbing compounds such as photochromic pigments, the activating light absorbing compounds inhibiting ultraviolet light from being transmitted to the eye of a user wearing the spectacle lens.

U.S. 2008/316558 A1 discloses a method of transferring a pattern onto a surface of an optical article by transferring a transferrable material via a stamp.

EP20182515.5 discloses a method for drying and curing, sintering and/or hardening at least one coating precursor material by applying at least one single electromagnetic pulse. The at least one coating precursor material may comprise a hard coating precursor material in a hard coating. The total process duration needed for drying and curing, sintering and/or hardening at least one coating precursor material is reduced when compared to a conventional thermal curing process applying direct heat for example in an oven. Further, the optical properties and/or the mechanical properties are tunable when varying the process parameters of the at least one single electromagnetic pulse.

Based on the theory that creating peripheral foci in front of or behind the retina to reduce or to stop the stimulus on the retina of the eye for the eye to grow, several designs for spectacle lenses were proposed as described before. The stimulus stems from a myopic or hyperopic defocus for peripheral vision, i.e., foci being positioned behind the retina or in front of the retina. When correcting the refraction of, for example, a myopic eye with a spectacle lens comprising a first refraction area and second refraction areas according to FIG. 1 of U.S. 2017/013167 A1, in foveal vision viewing through the hexagonal first refraction area having a refractive power based on a prescription for correcting an abnormal refraction of an eye, a light bundle, coming from infinity, is refracted by the first refraction area, the cornea of the eye and the other optical components of the eye to converge to a focus situated directly on the retina, in fact on the fovea of the eye. An object point at infinity forms a perfect image for the spectacle lens wearer. Therefore, in foveal vision the eye is supposed to grow unaltered, subject to anatomical conditions not allowing the unaltered growth. In peripheral vision viewing through one of the second refraction areas shown in FIG. 1 of U.S. 2017/013167 A1 a light bundle, coming from infinity, is refracted by that second refraction area, the cornea of the eye and the other optical components of the eye to converge to a focus situated in front of the retina of the eye. Therefore, in peripheral vision where the foci are situated in front of the retina of the eye, the eye is supposed to reduce the speed of the eye growth or even to stop it completely. However, the retina of the eye is not so uniformly curved that a light bundle, coming from infinity, and being refracted by any one of the second refraction areas, the cornea of the eye and the other optical components of the eye necessarily converges to a focus situated in front of the retina of the eye. Further, the retina of the eye and the anatomy of the eye itself is individually formed or curved and thus not identical for different persons. Even the retina of the left eye and the retina of the right eye of one person are not identically formed or curved. The progression of myopia or hyperopia is not suppressible when correcting the refraction of each spectacle lens wearer with a spectacle lens comprising as for example in FIG. 1 of U.S. 2017/013167 A1 the identical defined first refraction area and the identical defined second refraction areas. U.S. 2017/013167 A1 is silent with respect to the manufacturing method of a spectacle lens comprising a first refraction area and second refraction areas. WO 2019/16653 A1, WO 2019/166654 A1, WO 2019/166655 A1, WO 2019/166657 A1, and WO 2019/166659 A1 for example suggest for manufacturing of the spectacle lenses described therein different technologies such as direct surfacing, molding, casting or injection, embossing, filming, or photolithography. Using for example a molding process for manufacturing one the spectacle lenses described in U.S. 2017/013167 A1, WO 2019/16653 A1, WO 2019/166654 A1, WO 2019/166655 A1, WO 2019/166657 A1, or WO 2019/166659 A1 requires each a master mold of extremely high robustness and of high quality to be able to obtain the respective optical surfaces. A mold made of glass would fulfill the before mentioned requirements but is challenging and expensive to process. Using a molding process would require a different master mold for each optical surface to be realized therewith, which is for example for efficiency and cost reasons not suitable or at least not the first choice in a high throughput manufacturing process.

A very reliable method for manufacturing any desired optical surface without the need of a mold is disclosed in EP 3 812 142 A1. The method disclosed in EP 3 812 142 A1 allows even the manufacturing of final optical surfaces which are not accessible by conventional grinding and polishing processes. The method disclosed herein is independent of the optical material to be used for the lens substrate. The method requires at least one coating completely or at least partially covering the uncoated or pre-coated lens substrate, the at least one coating being modifiable when contacting or contacted with at least one medium. The modification of the at least one coating is preferably irreversible and of long-term stability. In contrast to EP 3 531 195 A1 for example no additional coating is required to modify or to adapt and/or to create any desired final optical surface However, as described in EP 3 812 142 A1 the period of time for contacting the at least one coating modifiable when contacted with at least one medium able to modify the at least one coating lies within a range of preferably 25 minutes to 30 hours, further preferably 30 minutes to 20 hours, more preferably 35 minutes to 15 hours and most preferably 40 minutes to 10 hours. The at least one coating may be contacted with the at least one medium at room temperature, i.e., at a temperature of 22° C. ±2° C., or at elevated temperatures comprising a temperature range of preferably 25° C. to 80° C., further preferably 27° C. to 55° C., more preferably 30° C. to 50° C. and most preferably 35° C. to 45° C. The at least one coating may be contacted with the at least one medium while irradiation with xenon preferably of a wavelength range of 280 nm to 1200 nm. The process conditions disclosed and before mentioned in EP 3 812 142 A1 may be combined in any desired way.

SUMMARY

It is an object of the present disclosure to provide an alternative method for the surface modification of a spectacle lens and to thereby simultaneously accelerate the time to obtain the spectacle lens. Further, the optical material of the lens substrate should not be restricted.

This object is achieved by a method for manufacturing a spectacle lens including contacting the surface of the at least one coating composition with at least one mechanical means.

DESCRIPTION OF EXEMPLARY EMBODIMENTS

The lens substrate typically is based on an optical material, the optical material being defined according to section 3.3.1 of DIN EN ISO 13666:2019-12 as transparent material capable of being manufactured into optical components. The spectacle lens substrate may be made of mineral glass according to section 3.3.1 of DIN EN ISO 13666:2019-12 and/or of an organic hard resin such as a thermosetting hard resin according to section 3.3.3 of DIN EN ISO 13666:2019-12; a thermoplastic hard resin according to section 3.3.4 of DIN EN ISO 13666:2019-12; or a photochromic material according to section 3.3.5 of DIN EN ISO 13666:2019-12.

Typically, the spectacle lens substrate is based on at least one of the optical materials mentioned in the following table, particularly preferred on at least one of the organic hard resins.

TABLE

Examples of optical materials

| Trade name | Optical material | Average refractive index $n_D$* | Abbe number $v_D$* |
|---|---|---|---|
| CR-39, CR-330, CR-607, CR-630, RAV 700, RAV 7NG, RAV 7AT, RAV 710, RAV 713, RAV 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan, Makrolon | Polycarbonate (PC) | 1.590 | 29 |
| MR-6 | Polythiourethane | 1.598 | |
| MR-8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| Spectralite | Urethane/Methacrylate | 1.54 | |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

In EP 3 812 142 A1 the surface modification of the at least one coating that is modifiable when contacted with at least one medium able to modify the at least one coating is typically a diffusion-controlled swelling of the at least one coating. It has now been discovered that the surface modification, in particular the modification of the surface topography of the at least one coating, not necessarily needs to be a swelling process induced by at least one medium, typically at least one acid as described in EP 3 812 142 A1, but that a surface modification is also possible by using at least one simple mechanical means. As in EP 3 812 142 A1 the at least one coating itself is modified without the need of applying an additional coating. The at least one mechanical means is not to be confused with the layer of nanoparticles and/or microparticles that is used for example in EP 3 531 195 A1 for masking a coating to which an additional coating has to be applied to provide a structure that is based on the additional coating being in the space between the nanoparticles and/or microparticles. Further, the at least one mechanical means is not to be confused with a transferable pattern via a stamp as disclosed in WO 2007/066006 A2 for example.

To modify at least one coating by contacting with at least one mechanical means, the at least one coating is applied to an uncoated or precoated surface of a lens substrate. In contrast to a conventional coating process the at least one coating applied is not cured and/or hardened but typically dried and/or precured only. The drying and/or precuring typically ensures that the at least one coating is not running off the uncoated or precoated surface of the lens substrate to which it is applied. Further, the drying and/or precuring typically ensures that the at least one coating is still modifiable when contacted with at least one mechanical means. The drying and/or precuring typically enhances the viscosity of the at least one coating without curing and/or hardening the at least one coating. The at least one mechanical means is typically contacted with the surface of the at least one precured coating. The contacting is typically achieved by touching the surface of the at least one precured coating with the at least one mechanical means or by dipping the at least one mechanical means into the at least one precured coating. After the at least one mechanical means is removed or pulled out of the at least one coating, at least one localized change in the coating thickness is observed. The at least one localized change in the coating thickness is typically observed as at least one micro lens.

The at least one mechanically means is in contact with the at least one precured or dried coating typically temporarily only.

As at least one mechanical means at least one contact head, an array of contact heads, a device comprising at least one contact head, at least one needle, an array of needles, and/or a device comprising at least one needle may be used. Typically in an array of contact heads or in a device comprising at least two contact heads, each contact head is controllable or separately addressable. Typically in an array of needles or in a device comprising at least two needles, each needle is controllable or separately addressable. In an array of contact heads or in a device comprising at least two contact heads, each contact head may have an identical form and an identical dimension or at least one of the contact heads may have a different form and/or a different dimension. In an array of needles or in a device comprising at least two needles, each of the needles may have an identical form and an identical dimension or at least one the needles may have a different form and/or a different dimension. In case one single contact head or one single needle should be used for the surface modification of the at least one coating, i.e., not an array or device comprising at least two contact heads or at least two needles, is should be mentioned that in this case at least two single contact heads or at least two single needles, for example of identical form and dimension or of different form or dimension, are usable.

Dependent at least on the adjusted viscosity of the at least one precured coating, the velocity of the removal of or pulling out the at least one mechanical means, the direction of touching the surface of the at least one precured coating with the at least one mechanical means, the direction of dipping the at least one mechanical means into the at least one precured coating, and/or the at least one mechanical means used for the surface modification of the at least one coating, provides a very large diversity of possible variations to modify the surface topography of the at least one precured coating.

The modification of the surface topography of the at least one coating may result in at least one micro lens of adjustable dimension and shape. The at least one micro lens may show a 3D Gaussian shape, a 3D Gaussian shape with flat top, a volcano shape with crater or a complex shape or any mixed shape thereof. The shape of the at least one micro lens may be symmetrical or unsymmetrical. The at least one micro lens is typically having a height in the range of typically 1 nm to 10 μm, further typically 2 nm to 9 μm, further typically 3 nm to 8 μm, more typically in the range of 4 nm to 7 μm and most typically in the range of 5 nm to 6 μm. For surface modifications resulting in a complex shape the before mentioned ranges typically apply for the maximum height thereof. With respect to the lateral extension, the width, typically a range of 5 μm to 20 mm, further typically of 10 μm to 10 mm, further typically of 20 μm to 5 mm, more typically of 50 μm to 4 mm and most typically of 70 μm to 3 mm may be achieved by the modification of the surface topography of the at least one coating by contacting with at least one mechanical means. The dimensions are typically determined by an optical profiler based on white light interferometry.

With respect to the achievable surface power of a local surface modification resulting in a micro lens or lenslet a large range is adjustable by the large variety of modification possibilities mentioned before. the surface power may be in a range of 0.2 diopters to 50 diopters, and is typically in a range of 0.25 diopters to 40 diopters, further typically in a range of 0.3 diopters to 30 diopters, more typically in a range of 0.4 diopters to 20 diopters, and most typically in a range of 0.5 diopters to 10 diopters. The surface power may be calculated as explained in EP 3 812 142 A1.

After the surface of the at least one precured coating has been modified by at least one mechanical means, the at least one coating is cured and/or hardened by a conventional curing process usually used for the respective at least one coating, for example by applying direct heat in an oven, or the at least one coating is cured and/or hardened by applying at least one electromagnetic pulse, for example using a flashlight annealing or photonic curing method. Irrespective of the curing and/or hardening method used, the total process duration for obtaining a modified surface of the at least one coating is significantly reduced when compared to the method disclosed in EP 3 812 142 A1. Nevertheless, identical or at least similar surface modifications comprising at least one micro lens are achievable by contacting a precured surface of at least one coating with at least one mechanical means.

Using the photonic curing method by applying at least one single electromagnetic pulse to the at least one modified surface has the advantage to minimize the risk of an unwanted or uncontrollable subsequent further modification due to for example a too low viscosity of the respective at least one precured coating. The method is further compatible with temperature sensitive lens substrates, i.e., temperature sensitive lens substrates are not deteriorated even if high temperatures for a very short time are reached. Applying at least one single electromagnetic pulse to cure and/or harden the at least one precured coating further has the advantage that the total process duration for curing and/or hardening is significantly reduced when compared to a thermal curing process for example or to the method disclosed in EP 3 812 142 A1.

The at least one single electromagnetic pulse can be applied from at least one electromagnetic source selected from the group consisting of at least one flash lamp, typically from at least one xenon flash lamp, at least one halogen lamp, at least one directed plasma arc, at least one laser, at least one microwave generator, at least one induction heater, at least one electron beam, at least one stroboscope and at least one mercury lamp. The at least one single electromagnetic pulse is typically applied from at least one flash lamp. Typically the at least one flash lamp is a flash lamp filled with a gas selected from xenon, krypton and/or argon, typically xenon. The at least one single electromagnetic pulse has typically a wavelength in the range from 100 nm to 1800 nm, more typically in the range from 150 nm to 1300 nm, most typically in the range from 200 nm to 1000 nm. The at least one single electromagnetic pulse also typically has a wavelength in the range from 350 nm to 1000 nm, more typically in the range from 400 nm to 800 nm, most typically in the range from 420 nm to 700 nm. The wavelength of the at least one single electromagnetic pulse applied from at least one of the before mentioned electromagnetic sources is typically in these wavelength ranges.

The at least one single electromagnetic pulse is applied to at least one of the surfaces of the spectacle lens, i.e., (i) to the front surface of the spectacle lens, (i) to the back surface of the spectacle lens or (iii) to the front surface and the back surface of the spectacle lens. In case (iii) when at least one single electromagnetic pulse is to be applied to the front surface and the back surface of the spectacle lens the position of one of the electromagnetic sources mentioned before may be alternated so that the at least one single electromagnetic pulse is either directly applied to the front surface or directly applied to the back surface of the spectacle lens. Alternatively, in the before mentioned case (iii) at least two of the electromagnetic sources mentioned before are positioned in that the at least one single electromagnetic pulse is directly applied to the front surface of the spectacle lens and at least one single electromagnetic pulse is directly applied to the back surface of the spectacle lens, either simultaneously or alternately. In any case at least two electromagnetic sources are used these at least two electromagnetic sources may be of the identical type or of a different type.

"Single electromagnetic pulse" means the light that is delivered by at least one of the above-mentioned electromagnetic sources and applied to at least one surface of the spectacle lens comprising the at least one coating to be modified. The at least one single electromagnetic pulse may be applied in one of the wavelength ranges defined above. The at least one single electromagnetic pulse typically has a defined duration, i.e., a defined envelope. The envelope of the at least one single electromagnetic pulse is defined as the period in which the at least one single electromagnetic pulse is applied to the at least one surface of the spectacle lens comprising the at least one coating to be modified. The envelope may be in a range from 50 µs to 200 ms, typically in a range from 100 µs to 150 ms. Each single electromagnetic pulse may comprise at least two micro-pulses, each of the at least two micro-pulses having a defined duration within the envelope of each single electromagnetic pulse. The duration of the at least two micro-pulses within the envelope of a single electromagnetic pulse may be identical to or different from each other. The percentage of the duration of all the micro-pulses within the envelope of a single electromagnetic pulse is defined as the duty cycle of the single electromagnetic pulse. Further, the at least one single electromagnetic pulse or at least one micro-pulse has a defined peak intensity. The peak intensity is defined as the rate at which light energy is applied per unit time to a unit area of the at least one coating, the at least one coating being covered completely or at least partially by the at least one medium, by one single electromagnetic pulse or one micro-pulse within a single electromagnetic pulse. The peak intensity is typically in the range from 0.01 W/cm² to 200 W/cm², further typically in the range from 0.1 W/cm² to 150 W/cm², more typically from 0.5 W/cm² to 100 W/cm² and most typically from 1 W/cm2 to 60 W/cm2. The peak intensity of at least two micro-pulses within the envelope of a single electromagnetic pulse may be identical to or different from each other. Typically the peak intensity of the at least two micro-pulses within the envelope of a single electromagnetic pulse is identical to each other. The peak intensity between two consecutive micro-pulses within the envelope of a single electromagnetic pulse does not need to be zero or does not need to be constant or does not need to be equal.

If necessary, each single electromagnetic pulse may be repeated to provide an electromagnetic pulse train. Within the electromagnetic pulse train, each single electromagnetic pulse may be repeated at least twice and up to 1000 times, typically each single electromagnetic pulse is repeated between 2 and 100 times. Within an electromagnetic pulse train, typically an identical single electromagnetic pulse is repeated. Within an electromagnetic pulse train, the envelope of each single electromagnetic pulse may be identical to or different from each other. Typically, within an electromagnetic pulse train, the envelope of each single electromagnetic pulse is identical. Within an electromagnetic pulse train, each single electromagnetic pulse may comprise at least two micro-pulses, the at least two micro-pulses may be identical to or different from each other with respect to their peak intensity, duration and/or duty cycle. Typically, within an electromagnetic pulse train, each single electromagnetic pulse may comprise at least two micro-pulses, the at least two micro-pulses being identical to each other with respect to their peak intensity, duration and/or duty cycle. Within the electromagnetic pulse train comprising at least two single electromagnetic pulses, the at least two single electromagnetic pulses may be repeated with a repetition rate in a range from 0.1 Hz to 5 Hz, typically from 0.2 Hz to 4 Hz, further typically from 0.3 Hz to 3.5 Hz and most typically from 0.4 to 2 Hz. The peak intensity of at least one single electromagnetic pulse within the envelope of the at least one single electromagnetic pulse may progressively decrease within the envelope and/or with each micro-pulse within the at least one single electromagnetic pulse. For example, this decrease can be due to limitations of the charged capacitors of the electromagnetic source used for generating the at least one single electromagnetic pulse. The dose applied by at least one single electromagnetic pulse to the spectacle lens comprising the at least one coating, the at least one coating being covered completely or at least partially with the at least one medium, is the average intensity delivered with each single electromagnetic pulse over the total duration of the envelope where each single electromagnetic pulse may or may not comprise at least two micro-pulses each delivering a discrete amount of intensity. The dose applied by at least one single electromagnetic pulse may typically be within the range from 0.001 J/cm² to 50 J/cm², further typically from 0.1 J/cm² to 30 J/cm², more typically from 1 J/cm² to 20 J/cm² and most typically from 2.0 J/cm² to 15 J/cm². Particularly typically, the dose applied is within a range from 3 J/cm² to 8 J/cm².

The application of at least one single electromagnetic pulse comprises the application of exact one single electromagnetic pulse, the exact one single electromagnetic pulse may be subdivided as described above in at least two micro-pulses. The application of at least one single electromagnetic pulse also comprises the application of single electromagnetic pulses, typically at least two single electromagnetic pulses, further typically a plurality of single electromagnetic pulses, each of which again may be subdivided in at least two micro-pulses as explained before. Independent of the exact number of single electromagnetic pulses the before given explanations with respect to the at least one single electromagnetic pulse shall apply.

The spectacle lens may comprise at least one coating being modifiable when contacted with at least one mechanical means on the front surface, according to ISO 13666: 2019(E), section 3.2.13, the surface of the lens intended to be fitted away from the eye, and/or on the back surface, according to ISO 13666:2019(E), section 3.2.14, the surface of the lens intended to be fitted nearer to the eye. The term front surface and the term back surface according to the definitions given before shall apply to the lens substrate as well. Typically, the spectacle lens comprises the at least one coating being modifiable when contacted with at least one mechanical means on the front surface thereof. In case a photonic curing method is used for curing and/or hardening the modified surface, the at least one single electromagnetic pulse may be applied to the front surface and/or to the back surface of the spectacle lens comprising the at least one modifiable coating. Typically, the at least one single electromagnetic pulse is applied to the front surface of the spectacle lens, the front surface typically comprising the at least one coating. However, in case the spectacle lens comprises at least one modifiable coating on the front surface and on the back surface thereof, the at least one single electromagnetic pulse may be still be applied to one surface only, for example to the front surface only. In this case the at least one coating, modified or not modified, on the opposite surface, here the back surface of the spectacle lens, may be cured and/or hardened simultaneously and typically within the same time by the at least one single electromagnetic pulse applied to the one surface only, here the front surface. This simultaneous modification is assumed to be based on the transfer of energy from the at least one single electromagnetic pulse to both the front surface and back surface of the lens substrate due to minor differences in the transparency of the lens substrate and the at least one modifiable coating. The transparency typically is the transmittance at a given wavelength, the transmittance typically determined by using a UV VIS spectrometer, e.g., the UV VIS spectrometer Perkin Elmer 950S of Perkin Elmer. The part of light of the at least one single electromagnetic pulse that is not or only minimally absorbed by the at least one modifiable coating and/or the lens substrate is reflected at all possible interfaces, for example at the interface between the lens substrate and the adjacent coating and/or at the interface between the stage on which the spectacle lens is placed and the adjacent coating. The part of light of the at least one single electromagnetic pulse that is absorbed for example by the lens substrate is assumed to be responsible for a short instantaneous heating of the lens substrate while still not deteriorating the lens substrate. In addition, as due to the short instantaneous heating of the lens substrate the temperature is higher than the temperature of the at least one modifiable coating, it is assumed that the curing and/or hardening of the at least one coating on the opposite surface is based on an indirect effect caused by the at least one single electromagnetic pulse applied. Further, the back reflection of the at least one single electromagnetic pulse from the stage on which the spectacle lens is placed is also assumed to contribute to the curing and/or hardening of the at least one coating on the opposite surface to which the at least one single electromagnetic pulse is not directly applied to. The combination of at least the direct energy transfer from the at least one single electromagnetic pulse, the indirect energy transfer from the heated lens substrate and the indirect energy transfer from the stage is assumed to be a reasoned explanation for a simultaneous curing and/or hardening of the at least one coating by the at least one medium on the front surface and of the back surface of a spectacle lens by applying at least one single electromagnetic pulse to one of the surfaces only. Typically, the total process duration is not or at least not significantly prolonged by applying the at least one single electromagnetic pulse to one surface only but simultaneously curing and/or hardening at least one coating on both surfaces.

The total process duration, i.e., the total time needed for curing and/or hardening the at least one modified coating applied on at least one surface of an uncoated or precoated lens substrate by using at least one single electromagnetic pulse as described above, lies within a range typically from 100 µs to 7 min, further typically from 300 µs to 5 min, more typically from 500 µs to 4 min and most typically from 1 ms to 3 min. The total process duration for curing and/or hardening the at least one modified coating applied on at least one surface of an uncoated or precoated lens substrate by using a conventional thermal curing process, i.e., applying direct heat via an oven, may be up to three hours. Both variants for curing and/or hardening allow the surface modification of the at least one precured coating in a reduced time compared to the method disclosed in EP 3 812 142 A1.

The modification of the at least one precured coating by contacting with at least one mechanical means may result in a target optical surface which may be identical to a target optical surface achievable by the method disclosed in EP 3 812 142 A1, but as mentioned before, the total process duration is much shorter than the contact time needed in EP 3 812 142 A1, although the precuring of the at least one coating, the surface modification resulting from contacting with at least one mechanical means and the additional curing and/or hardening are three steps to be performed.

The curing and/or hardening of the at least one coating may be done in a batch process or in a continuous process. A batch process may be done for example with no displacement. A continuous process may be done for example with displacement. An example of the continuous process is by using a conveyor belt.

The surface modification of the at least precured coating typically is irreversible after curing and/or hardening.

The at least one coating that may be, typically after drying and/or precuring, modifiable when contacted with at least one mechanical means typically is selected from at least one of the group consisting of at least one primer coating, at least one hard coating, at least one photochromic coating and at least one coating based on a coating composition usable as photochromic coating but not comprising at least one photochromic dye.

The at least one hard coating may be based on at least one of the hard coating compositions disclosed in US 2005/ 0171231 A1, in US 2009/0189303 A1 or in US 2002/ 0111390 A1. Alternatively, the at least one hard coating may be based on the abrasion resistant coating composition disclosed in WO 2007/070976 A1.

The at least one hard coating typically is based on at least one hard coating composition disclosed in EP 2 578 649 A1, particularly in EP 2 578 649 A1, claim 1. The at least one hard coating composition configured to produce the at least one hard coating typically comprises A) a) at least one silane derivative of the formula (I) $Si(OR^1)(OR^2)(OR^3)(OR^4)$, wherein $R^1$, $R^2$, $R^3$ and $R^4$, which may be the same or different, are selected from an alkyl, an acyl, an alkyleneacyl, a cycloalkyl, an aryl or an alkylenearyl group, each of which may optionally be substituted, and/or
b) at least one hydrolysis product of the at least one silane derivative of the formula (I), and/or
c) at least one condensation product of the at least one silane derivative of the formula (I), and/or
d) any mixture of the components a) to c) thereof;
B) a) at least one silane derivative of the formula (II) $R^6R^7_{3-n}Si(OR^5)_n$, in which $R^5$ is selected from an alkyl, an acyl, an alkyleneacyl, a cycloalkyl, an aryl or an alkylenearyl group, each of which may optionally be substituted, $R^6$ is an organic radical containing at least one epoxide group, $R^7$ is selected from an alkyl, a cycloalkyl, an aryl or an alkylenearyl group, each of which may optionally be substituted, n is 2 or 3; and/or
b) at least one hydrolysis product of the at least one silane derivative of the formula (II), and/or
c) at least one condensation product of the at least one silane derivative of the formula (II), and/or
any mixture of the components a) to c) thereof;
C) at least one colloidal inorganic oxide, hydroxide, oxide hydrate, fluoride and/or oxyfluoride;
D) at least one epoxide compound having at least two epoxide groups; and
E) at least one catalyst system comprising at least one Lewis acid and at least one thermolatent Lewis acid-base adduct.

The term "at least one hydrolysis product" of the at least one silane derivative of the formula (I) or (II) respectively expresses the fact that the at least one silane derivative of the formula (I) or of the formula (II) each has already been at least partly hydrolyzed to form silanol groups.

The term "at least one condensation product" of the at least one silane derivative of the formula (I) or of the formula (II) respectively expresses the fact that a certain degree of crosslinking has also already taken place through condensation reaction of the silanol groups.

The at least one silane derivative of the formula (I) may be selected from tetramethoxysilane, tetraethoxysilane, tetrapropoxysilane, tetraisopropoxysilane, tetrabutoxysilane, tetraisobutoxysilane, tetrakis(methoxyethoxy)silane, tetrakis(methoxy-propoxy)silane, tetrakis(ethoxyethoxy)silane, tetrakis(methoxyethoxyethoxy)silane, trimethoxyethoxysilane, dimethoxydiethoxysilane or mixtures thereof.

The at least one silane derivative of the formula (II) may be selected from 3-glycidoxy-methyltrimethoxysilane, 3-glycidoxypropyltrihydroxysilane, 3-glycidoxypropyldimethyl-hydroxysilane, 3-glycidoxypropyldimethylethoxysilane, 3-glycidoxypropylmethyl-diethoxysilane, 3-glycidoxypropyltrimethoxysilane, 3-glycidoxypropyltriethoxysilane, 3-glycidoxypropyldimethoxymethylsilane, 3-glycidoxypropyldiethoxymethylsilane, 2- (3 ,4-epoxycyclohexyl)ethyltrimethoxysilane or mixtures thereof.

The at least one colloidal inorganic oxide may be selected from silicon dioxide, titanium dioxide, zirconium dioxide, tin dioxide, antimony oxide, aluminum oxide, silver oxide, copper oxide or mixtures thereof.

The mean particle diameter of the at least one colloidal inorganic oxide, hydroxide, fluoride or oxyfluoride is typically selected such that the transparency of the at least one hard coating is not affected. Typically, the at least one colloidal inorganic oxide, hydroxide, oxide hydrate, fluoride and/or oxyfluoride has a mean particle diameter in the range of from 2 nm to 150 nm, even more typically of from 2 nm to 70 nm. The mean particle diameter is determined typically by means of dynamic light scattering. The at least one colloidal inorganic oxide, hydroxide, oxide hydrate, fluoride or oxyfluoride contributes to an increase in scratch resistance through incorporation into the existing network. In addition, selection of at least one colloidal inorganic oxide, hydroxide, oxide hydrate, fluoride or oxyfluoride allows the refractive index of the at least one hard coating to be matched to the refractive index of the uncoated spectacle lens substrate or to a precoating of the spectacle lens substrate.

The at least one epoxide compound having at least two epoxide groups is typically a polyglycidyl ether compound, more typically a diglycidyl ether or triglycidyl ether compound. For example, as at least one epoxide compound comprising at least two epoxide compounds digylcidyl ether, ethylenglycoldiglycidyl ether, propylenglycoldiglycolglycidyl ether, 1,4 -butandioldiglycidyl ether, 1,6-hexandioldiglycidyl ether, trimethylolpropantriglycidyl ether, triglycidylglycerin and/or trimethylolethantriglycidylether may be used in the coating composition. Typically, the at least epoxide compound comprises trimethylolpropantriglycidyl ether, butandioldiglycidyl ether and/or 1,6-hexandioldiglycidyl ether.

The at least one catalyst system comprising at least one Lewis acid and at least one thermolatent Lewis acid-base adduct enables very homogeneous crosslinking and hence also constantly high strength over the entire layer thickness of the at least one hard coating. The term "Lewis acid" relates to an electrophilic electron pair acceptor compound, the term "Lewis base" is understood to mean an electron pair donor compound. The at least one Lewis acid is typically one which have catalytic activity even at relatively low temperatures, for example at room temperature. The at least one Lewis acid may be selected from ammonium salts, metal salts, especially of metals from one of groups 1 (i.e., alkali metal salts), 2 (i.e., alkaline earth metal salts) or 13 (typically Al or B) of the periodic table of the elements, halides of an element of group 13 of the periodic table of the elements (especially $AlX_3$ or $BX_3$, where X is chlorine or fluorine), organic sulphonic acids and amine salts thereof, alkali metal or alkaline earth metal salts, for example alkali metal or alkaline earth metal salts of carboxylic acids, fluoride salts, organotin compounds, or a mixture thereof. Preferred metal salts of metals from one of the groups 1, 2 and 13 of the periodic table of the elements are, for example, perchlorates or carboxylates. Preferred Lewis acids are, for example, ammonium perchlorate, magnesium perchlorate, sulphonic acids and salts thereof, such as trifluoromethanesulphonic acid and salts thereof.

The at least one Lewis acid-base adduct is understood to mean a compound which has catalytic activity with regard to the chemical reaction in question only at relatively high temperatures, while it is essentially still catalytically inactive at room temperature. Only through the supply of sufficient thermal energy is a thermolatent catalyst compound converted to a catalytically active state.

The at least one silane derivative of the formula (I) and/or the at least one hydrolysis product of the silane derivative of the formula (I) and/or the at least one condensation product of the silane derivative of the formula (I) is/are typically present in the at least one hard coating composition in an amount of 5% by weight to 50% by weight, more typically of 6% by weight to 20% by weight, each based on the total weight of the at least one hard coating composition. The amounts given before apply with regard to the at least one silane derivative of the formula (I), with regard to the at least one hydrolysis product of the formula (I), with regard to the at least one condensation product of the formula (I) or with regard to any mixture thereof. The amounts given before apply as well with regard to a mixture of silane derivatives of the formula (I), with regard to a mixture of hydrolysis products of the at least one silane derivative of the formula (I), with regard to a mixture of condensation products of the at least one silane derivative of the formula (I) or with regard to any mixture thereof.

The at least one silane derivative of the formula (II) and/or the at least one hydrolysis product of the silane derivative of the formula (II) and/or the at least one condensation product of the silane derivative of the formula (II) is/are typically present in the at least one hard coating composition in an amount of 5% by weight to 50% by weight, more typically of 6% by weight to 20% by weight, each based on the total weight of the at least one hard coating composition. The amounts given before apply with regard to the at least one silane derivative of the formula (II), with regard to the at least one hydrolysis product of the formula (II), with regard to the at least one condensation product of the formula (II) or with regard to any mixture thereof. The amounts given before apply as well with regard to a mixture of silane derivatives of the formula (II), with regard to a mixture of hydrolysis products of the at least one silane derivative of the formula (II), with regard to a mixture of condensation products of the at least one silane derivative of the formula (II) or with regard to any mixture thereof.

The weight ratio of the at least one silane derivative of the formula (I), the at least one hydrolysis product of the silane derivative of the formula (I) and/or the at least one condensation product of the silane derivative of the formula (I) relative to the at least one silane derivative of the silane derivative of the formula (II), the at least one hydrolysis product of the silane derivative of the formula (II) and/or the at least one condensation product of the silane derivative of the formula (II) is typically in the range of from 95/5 to 5/95, more typically in the range of from 70/30 to 30/70, and most typically in the range of from 60/40 to 40/60.

The at least one colloidal inorganic oxide, hydroxide, fluoride and/or oxyfluoride is/are present in the at least one hard coating composition typically in an amount of 5% by weight to 50% by weight, more typically of 6% by weight to 25% by weight, each based on the total weight of the at least one hard coating composition. The amounts mentioned before apply for one type of colloidal oxide, one type of hydroxide, one type of fluoride, one type of oxyfluoride, for a mixture thereof, for a mixture of different colloidal oxides, a mixture of different colloidal hydroxides, a mixture of different colloidal fluorides, a mixture of different colloidal oxyfluorides or for any mixture thereof. The mixture of different colloidal oxides, hydroxides, fluorides or oxyfluorides may for example comprise one type of each in different particle sizes or different types of each in the same or in a different particle size.

The at least one epoxide compound having at least two epoxide groups is present in the at least one hard coating composition typically in an amount of 0.1% by weight to 10% by weight, more typically of 0.5% by weight to 10% by weight, each based on the total weight of the at least one hard coating composition. The amounts given before apply with regard to one type of epoxide compound or to a mixture of different types of epoxide compounds.

The at least one catalyst system is present in the at least one hard coating composition typically in an amount in the range from 0.01% by weight to 5% by weight, more typically in the range from 0.1% by weight to 3% by weight, each based on the total weight of the hard coating composition.

The weight ratio of at least one Lewis acid to the at least one thermolatent Lewis acid-base adduct is typically in the range from 20/1 to 1/2, more typically from 5/1 to 2/1. The hard coating composition further comprises at least one solvent comprising at least one alcohol, at least one ether, at least one ester or water. In case the at least one solvent comprises two different solvents, the boiling point of the first solvent S1 and the boiling point of the second solvent S2 is either S1/S2≥1.2 or S1/S2≤0.8. Further, in case the at least one solvent comprises two different solvents, the weight ratio of the first solvent to the second solvent is typically in the range of from 5 to 0.01, more typically in the range of from 2 to 0.2.

Typically water is present in an amount of 2% by weight to 15% by weight, based on the total weight of the hard coating composition.

The use of the above mentioned coating composition comprising the components (A) to (E), i.e., at least one first silane derivative of formula (I), at least one hydrolysis product and/or at least one condensation product thereof, at least one second silane derivative of formula (II), at least one hydrolysis product and/or at least one condensation product thereof, at least one colloidal inorganic oxide, hydroxide, fluoride and/or oxyfluoride, at least one epoxide compound and at least one catalyst system, enables the production of at least one hard coating having very good adhesive strength having a high hardness; being of high scratch resistance and showing a low tendency to crack formation, typically despite of the modification of the surface topography that has been done by the contacting with at least one mechanical means. The at least one hard coating composition is typically cured and/or hardened by applying direct heat or at least one single electromagnetic pulse, as described below.

Alternatively or additionally to the before mentioned at least one hard coating composition resulting in at least one hard coating, the edge surface of an edged lens, optionally the front surface of a uncoated or precoated spectacle lens substrate and optionally the back surface of a uncoated of precoated spectacle lens substrate, each comprises at least one hard coating which is typically based on at least one hard coating composition comprising A) a) at least one silane derivative of the formula (III) $R^1R^2{}_{3-n}Si(OR^3)_n$, wherein $R^1$ comprises an alkyl group, a cyclo alkyl group, an acyl group, an aryl group or a hetero aryl group, each of which may be substituted, $R^2$ is an organic rest comprising an epoxide group, $R^3$ comprises an alkyl group, a cyclo alkyl group, an aryl group or a hetero aryl group, each of which may be substituted, n=2 or 3, and/or
  b) at least one hydrolysis product of the silane derivative of the formula (III), and/or
  c) at least one condensation product of the silane derivative of the formula (III), and/or
  d) any mixture of components a) to c);
B) at least one colloidal inorganic oxide, hydroxide, oxide hydrate, fluoride and/or oxyfluoride;
C) at least one epoxy component comprising at least two epoxy groups; and
D) at least one catalyst system comprising at least one Lewis acid and at least one thermolatent Lewis base-adduct.

The term "at least one hydrolysis product" of the at least one silane derivative of the formula (III) expresses the fact that the at least one silane derivative of the formula (III) has already been at least partly hydrolyzed to form silanol groups. The term "at least one condensation product" of the at least one silane derivative of the formula (III) expresses the fact that a certain degree of crosslinking has also already taken place through condensation reaction of the silanol groups.

The at least one silane derivative of the formula (III) and/or the at least one hydrolysis product of the silane derivative of the formula (III) and/or the at least one condensation product of the at least one silane derivative of the formula (III) and/or any mixture thereof is/are present in the at least one hard coating composition in a total amount in the range typically of from 9% by weight to 81% by weight, further typically of from 13% by weight to 76% by weight, more typically of from 19% by weight and most typically of from 23% by weight to 66% by weight, each based on the total weight of the at least one coating composition. The amounts given before apply with regard to the at least one silane derivative of the formula (III), with regard to the at least one hydrolysis product of the formula (III), with regard to the at least one condensation of the formula (III) or with regard to any mixture thereof. The amounts given before apply as well with regard to a mixture of silane derivatives of the formula (III), with regard to a mixture of hydrolysis products of the at least one silane derivative of the formula (III), with regard to a mixture of condensation products of the at least one silane derivative of the formula (III) or with regard to any mixture thereof.

The at least one colloidal inorganic oxide, hydroxide, oxide hydrate, fluoride and/or oxyfluoride is/are present in the at least one hard coating composition in a total amount in the range typically of from 3% by weight to 60% by weight, further typically of from 6% by weight to 58% by weight, more typically of from 9% by weight to 57% by weight and most typically of from 13% by weight to 55% by weight, each based on the total weight of the at least one hard coating composition. The amounts given before apply with regard to one type of colloidal inorganic oxide, one type of colloidal inorganic hydroxide, one type of colloidal inorganic oxide hydrate, one type of colloidal inorganic fluoride, one type of colloidal inorganic oxyfluoride and any mixture thereof. The amounts given before apply as well with regard to a mixture of different colloidal inorganic oxides, a mixture of different colloidal inorganic hydroxides, a mixture of different colloidal inorganic oxide hydrates, a mixture of different colloidal inorganic fluorides, a mixture of different colloidal inorganic oxyfluorides or any mixture thereof. The mentioned mixtures may include each different particles sizes or different types of colloidal inorganic oxides, hydroxides, oxide hydrates, fluorides and/or oxyfluorides.

The at least one epoxide compound comprising at least two epoxide groups is present in the at least one hard coating composition in an amount in the range typically of from 0.01% by weight to 14% by weight, further typically of from 0.07% by weight to 11% by weight, more typically of from 0.1% by weight to 6% by weight and most typically of from 0.2% by weight to 13% by weight, each based on the total weight of the at least one hard coating composition. The amount given before apply with regard to one type of epoxide compound as well as with regard to a mixture of different epoxide compounds.

The at least one catalyst system comprising at least one Lewis acid and at least one thermolatent Lewis base-adduct is present in the at least one hard coating composition in an amount in the range typically from 0.04% by weight to 4% by weight, further typically from 0.1% by weight to 3% by weight, more typically from 0.2% by weight to 2% by weight and most typically from 0.3% by weight to 1% by weight, each based on the total weight of the at least one hard coating composition. The weight ratio of the at least one Lewis acid to the at least one thermolatent Lewis base-adduct is typically in a range from 20:1 to 2:1, further typically from 18:1 to 1:2, more typically from 13:1 to 1:1 and most typically from 6:1 to 1:1.

The at least one hard coating composition may comprise at least one organic solvent and/or water. The components of the at least one hard coating composition resulting in at least one hard coating are used in that they add to 100% by weight based on the total weight of the at least one hard coating composition.

As at least one silane derivate of the formula (III) 3-glycidoxymethyl¬trimethoxysilane, 3-glycidoxypropyl-trihydroxy silane, 3-glycidoxyprop yl-dimethylhydroxy silane, 3-glycidoxy-propyldimethylethoxysilane, 3-glycidoxypropylmethyldiethoxysilane, 3-glycidoxypropyltrimethoxysilane, 3-glycidoxypropyl¬trimethoxysilane, 3-glycidoxypropyldimethoxymethyl¬silane, 3 -glycidoxypropyldiethoxymethylsilane and/or 2-(3,4-epoxycyclohexyl)ethyltrimethoxysilane for example may be used in the at least one hard coating composition. Typically, 3-glycidoxypropyltrimethoxysilane and/or 3-glycidoxy¬propyltriethoxysilane is/are used as silane derivative of the formula (III).

The at least one colloidal inorganic oxide, hydroxide and/or oxide hydrate may be a metal oxide, metal hydroxide and/or metal oxide hydrate, where the metal ions of the metal oxide, metal hydroxide and/or metal oxide hydrate comprise or are metals of titanium, typically $TiO_2$, of silicon, typically $SiO_2$, of zirconium, typically $ZrO_2$, of tin, typically $SnO_2$, of antimony, typically $Sb_2O_3$, of aluminum, typically $Al_2O_3$ or $AlO(OH)$, of silver, typically $Ag_2O$, of copper, typically $CuO$ or $Cu_2O$ and/or mixed oxides and/or mixtures thereof. Typically, the colloidal inorganic oxide, hydroxide, oxide hydrate is a metal oxide, metal hydroxide and/or metal oxide hydrate, wherein the metal ions of the metal oxide, metal hydroxide and/or metal oxide hydrate comprise or are metals of titanium, silicon, zirconium or mixtures thereof, further typically of silicon. Further typically, the at least one colloidal inorganic oxide, hydroxide and/or oxide hydrate form core-shell particles. In such core-shell particles the core comprises typically a metal oxide, metal hydroxide and/or metal oxide hydrate, wherein the metal ions of the metal oxide, metal hydroxide and/or metal oxide hydrate comprise or are metals of titanium, typically $TiO_2$, and/or of zirconium, typically $ZrO_2$ and the shell comprises typically a metal oxide, metal hydroxide and/or metal oxide hydrate, wherein the metal ions of the metal oxide, metal hydroxide and/or metal oxide hydrate comprise or are silicon, typically $SiO_2$. As colloidal inorganic fluoride magnesium fluoride may be used. The at least one colloidal oxide, hydroxide, oxide hydrate, fluoride and/or oxyfluoride has a mean particle size in the range typically from 3 nm to 70 nm, further typically from 6 nm to 64 nm, more typically from 8 nm to 56 nm and most typically from 9 nm to 52 nm.

As at least one epoxide compound comprising at least two epoxide compounds digylcidyl ether, ethylenglycoldiglycidyl ether, propylenglycoldiglycolglycidyl ether, 1,4 -butandioldiglycidyl ether, 1,6-hexandioldiglycidyl ether, trimethylolpropantriglycidyl ether, triglycidylglycerin and/or trimethylolethantriglycidylether for example may be used in the at least one hard coating composition. Typically, the at least epoxide compound comprises trimethylolpropantriglycidyl ether, butandioldiglycidyl ether and/or 1,6-hexandioldiglycidyl ether.

As at least one Lewis acid ammonium perchlorate, magnesium perchlorate, sulfonic acids and/or salts of sulfonic acids, such as trifluormethane sulfonic acid and/or salts thereof, for example may be used in the at least one catalyst system.

As at least one Lewis base-adduct a metal complex compound, such as aluminum acetylacetonate, iron acetylacetonate and/or zinc acetylacetonate, for example may be used in the at least one catalyst system.

The use of the at least one hard coating composition comprising the components (A) to (D), i.e., at least one silane derivative of the formula (III), at least one hydrolysis product and/or at least one condensation product thereof, least one colloidal inorganic oxide, hydroxide, oxide hydrate, fluoride and/or oxyfluoride, at least one epoxide compound and at least one catalyst system, enables the production of at least one hard coating having a high hardness; being of high scratch resistance and showing a low tendency to crack formation, preferable despite of the modification of the surface topography by the at least one mechanical means.

The at least one hard coating composition resulting in at least one hard coating is typically applied to the uncoated or precoated edge surface of an edged lens by means of a brush and/or a doctor blade. The at least one hard coating composition resulting in at least one hard coating is typically applied to the uncoated or precoated front surface and/or the uncoated or precoated back surface of a spectacle lens substrate of the edged lens by dip coating or by spin coating. In case the at least one hard coating composition resulting in at least one hard coating is simultaneously applied to the uncoated or precoated edge surface, the uncoated or precoated front surface and the uncoated or precoated back surface, typically the at least one hard coating composition is applied via dip coating.

The at least one hard coating composition is typically cured and/or hardened by the direct application of heat or by the application of at least one electromagnetic pulse.

The at least one primer coating is typically based on at least one primer coating composition comprising
  i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, typically at least one aqueous aliphatic polyurethane dispersion or at least one aqueous aliphatic polyester dispersion and more typically at least one aqueous aliphatic polyurethane dispersion,
  ii) at least one solvent,
  iii) optionally at least one additive.

The at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion is/are present in the at least one primer coating composition in a total amount selected from a range typically of from 2% by weight to 38% by weight, further typically of from 4% by weight to 34% by weight, further typically of from 5% by weight to 28% by weight, more typically of from 6% by weight to 25% by weight and most typically of from 7% by weight to 21% by weight, each based on the total weight of the at least one primer coating composition. The total amount comprises the amount of only one of the dispersions mentioned before or a mixture thereof.

The at least one primer coating composition comprises typically at least one aqueous polyurethane dispersion, wherein the polyurethane comprises a polyester unit as a spacer or the polyurethane dispersion is a polyurethane-polyurea dispersion, characterized by the occurrence of both urethane and urea groups in a macromolecular chain of the polyurethane-polyurea. Such polyurethane dispersions are described for example in WO 94/17116 A1, in particular in WO 94/17116 A1, page 7, lines 11 to 33. The aqueous polyurethane dispersion may be blended with anionically stabilized acrylic emulsions, as described in WO 94/17116 A1, in particular in WO 94/17116 A1, page 7, lines 33 to 35.

The at least one solvent is present in the at least one primer coating composition in an amount selected from a range typically of from 68% by weight to 99% by weight, further typically of from 69% by weight to 98% by weight, more typically of from 81% by weight to 97% by weight and most typically of from 89% by weight to 93% by weight, each based on the total weight of the at least one primer coating composition. The amounts mentioned before apply with regard to one type of solvent as well as with regard to a mixture of different solvents.

As at least one solvent typically at least one organic solvent with a low boiling point of <100° C. under normal pressure and at least one organic solvent with a middle boiling of 100° C. to 150° C. under normal pressure may be used. As at least one organic solvent with a low boiling point methanol, ethanol, 1-propanol, 2-propanol, tert-butanol, acetone, diethyl ether, tert-butylmethyl ether, tetrahydrofuran, chloroform, 1,2-dichlorethane, methylene chloride, cyclohexane, ethyl acetate, n-hexane, n-heptane and/or methyl ethyl ketone for example may be used. Typically, methanol, ethanol, 1-propanol and/or 2-propanol is/are used as at least one solvent with a low boiling point. As at least one organic solvent with a middle boiling point 1-methoxy-2-propanol, 1-butanol, dibutyl ether, 1,4-dioxan, 3-methyl-1-butanol, 4-hydroxy-4-methyl-2-pentanone, methylisobutylketone and/or toluol for example may be used. Typically, 1-methoxy-2-propanol and/or 4-hydroxy-4-methyl-2-pentanone is/are used as at least one solvent with a middle boiling point.

The weight ratio of the at least one solvent with a low boiling point to the at least one solvent with a middle boiling point is typically 1:1, further typically 1:1.4, more typically 1:1.5 and most typically 1:1.7.

As at least one solvent at least one organic solvent with a low boiling point, at least one solvent with a middle boiling point and water may be used. The weight ratio of the at least one solvent with a low boiling point to the at least one solvent with a middle boiling point to water is typically 2:7:1, further typically 2.5:6.5:1, further typically 3:6:1, more typically 3:5:1 and most typically 3:6:1.

The at least one primer coating composition may comprise optionally at least one additive. The at least one additive may comprise at least one dispersing agent, at least one anti-settling agent, at least one wetting agent, at least one biocide, at least one UV-absorber or mixtures thereof.

The at least one primer coating composition comprising the components i) to iii), i.e., the at least one dispersion, the at least one solvent and optionally the at least one additive, after application, drying and curing results in at least one primer coating. The curing and/or hardening of the at least one primer coating composition is performed via the direct application of heat or by the application of at least one single electromagnetic pulse.

The at least one photochromic coating may for example be based on a photochromic composition described in EP 1 433 814 A1, EP 1 602 479 A1 or EP 1 561 571 A1. The at least one coating based on a coating composition usually resulting in a photochromic composition may comprise a composition described in EP 1 433 814 A1, EP 1 602 479 A1 or EP 1 561 571 A1, but without any photochromic dye.

EP 1 433 814 A1, in particular EP 1 433 814 A1, claim 1, discloses a photochromic composition comprising (1) 100 parts by weight of radically polymerizable monomers; (2) 0.01 to 20 parts by weight of an amine compound; and (3) 0.01 to 20 parts by weight of a photochromic compound, the radically polymerizable monomers including a radically polymerizable monomer having a silanol group or a group which forms a silanol group by hydrolysis, and/or a radically polymerizable monomer having an isocyanate group. According to EP 1 433 814 A1 to increase adhesion between the photochromic coating resulting from the photochromic composition described therein and a spectacle lens substrate, a radically polymerizable monomer having a silanol group or a group which forms a silanol group by hydrolysis or a radically polymerizable monomer having an isocyanate group is used. Usable monomers are mentioned in EP 1 433 814 A1, page 3, paragraph [0025], to page 7, paragraph Additionally, according to EP 1 433 814 A1 the photochromic composition may include other radically polymerizable monomers. As other polymerizable monomers, a combination of a radically polymerizable monomer having a homopolymer L-scale Rockwell hardness of at least 60 ("high-hardness monomer") and a radically polymerizable monomer having a homopolymer L-scale Rockwell hardness of 40 or less ("low-hardness monomer") is typically used to improve the characteristic properties such as solvent resistance, hardness and heat resistance of the resulting photochromic coating or the photochromic properties thereof such as colour development intensity and fading speed. Examples and explanations with respect to the high-hardness monomers and the low-hardness monomers are given in EP 1 433 814 A1, page 7, paragraph [0052], to page 13, paragraph [0096]. To improve the balance of the characteristic properties such as solvent resistance, hardness and heat resistance or photochromic properties such as colour development intensity and fading speed of the resulting photochromic coating, the amount of a low-hardness monomer is typically 5 to 70% by weight and the amount of a high-hardness monomer is typically 5 to 95% by weight based on the total of all the other radically polymerizable monomers excluding the radically polymerizable monomer having a silanol group or a group which forms a silanol group by hydrolysis and the radically polymerizable monomer having an isocyanate group. Further, according to EP 1 433 814 A1, it is particularly preferred that a monomer having at least three radically polymerizable groups should be contained as the high-hardness monomer in an amount of at least 5% by weight based on the total of all other radically polymerizable monomers. Further typically, according to EP 1 433 814 A1, the radically polymerizable monomers include a radically polymerizable monomer having at least one epoxy group and at least one radically polymerizable group in the molecule besides the mentioned monomers classified by hardness. The durability of a photochromic compound and the adhesion of the photochromic coating can be improved by using the radically polymerizable monomer having at least one epoxy group. Radically polymerizable monomers having at least one epoxy group and at least one radically polymerizable group in the molecule are disclosed in EP 1 433 814 A1, page 13, paragraph , to page 14, paragraph [0105]. According to EP 1 433 814 A1, the amount of the radically polymerizable monomer having at least one epoxy group and at least one radically polymerizable group in the molecule is typically 0.01 to 30% by weight, particularly typically 0.1 to 20% by weight based on the total of all other radically polymerizable monomers. The photochromic composition described in EP 1 433 814 A1 comprises at least one amine compound in an amount of 0.01 to 20 parts by weight based on 100 parts by weight of the total of all the radically polymerizable monomers in addition to the above mentioned radically polymerizable monomers. Examples for the at least one amine compound is given in EP 1 433 814 A1, page 14, paragraph [0108], to page 15, paragraph [0112]. The photochromic composition disclosed in EP 1 433 814 A1 comprises at least one photochromic compound in an amount of 0.01 to 20 parts by weight, typically 0.05 to 15 parts by weight and more typically 0.1 to 10 parts by weight based on 100 parts by weight of the total of all radically polymerizable monomers. Examples for photochromic compounds are given in EP 1 433 814 A1, page 15, paragraph [0114] to page 20, paragraph [0122].

EP 1 602 479 A1, in particular EP 1 602 479 A1, claim 9, discloses a photochromic composition comprising 100 parts by weight of a radically polymerizable monomer, 0.001 to 5 parts by weight of a silicone base or fluorine base surfactant and 0.01 to 20 parts by weight of a photochromic compound. According to EP 1 602 479 A1, the photochromic composition comprises a radically polymerizable monomer having a silanol group or a group which forms a silanol group by hydrolysis, an amine compound and a photochromic compound. The use amount of the radically polymerizable monomer having a silanol group or a group which forms a silanol group by hydrolysis is suitably 0.5 to 20% by weight, particularly 1 to 10% by weight based on the total weight of the whole coating agents. Other radically polymerizable monomers which according to EP 1 602 479 A1 can be used together with the radically polymerizable monomer having a silanol group or a group which forms a silanol group by hydrolysis, such as for example trimethylolpropane trimethacrylate, trimethylolpropane triacrylate, tetramethylolmethane trimethacrylate, tetramethylolmethane triacrylate, trimethylolpropane triethylene glycol triacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, diethyleneglycol dimethacrylate, triethyleneglycol dimethacrylate, tetraethyleneglycol dimethacrylate, tripropyleneglycol dimethacrylate, bisphenol A dimethacrylate, 2,2-bis(4-methacryloyloxyethoxydiphenyl) propane, glycidyl methacrylate, 2,2-bis(4-acryloyloxypolyethylene glycol phenyl)propane having an average molecular weight of 776 or methyl ether polyethylene glycol methacrylate having an average molecular weight of 475. The use amount of the other radically polymerizable monomers is suitably 20 to 90% by weight, particularly 40 to 80% by weight based on the weight of the whole coating agents. The use amount of the amine compound, such as triethanolamine, N-methyldiethanolamine, triisopropanolamine, N,N-dimethylaminoethyl methacrylate or N,N-diethylaminoethyl methacrylate for example, is suitably 0.01 to 15% by weight, particularly 0.1 to 10% by weight based on the weight of the whole coating agents. The use amount of the photochromic compound such as a naphthopyran derivative, a chromene derivative, a spirooxazine derivative, a spiropyran derivative or a fulgimide derivative is suitably 0.1 to 30% by weight, particularly 1 to 10% by weight based on the weight of the whole coating agents.

In case the spectacle lens comprises at least one photochromic coating, typically the front surface of the spectacle lens comprising the at least one photochromic coating, the spectacle lens may optionally comprise at least one photochromic primer. Typically the front surface of the spectacle lens, typically corrective lens comprises the at least one photochromic primer and the at least one photochromic coating, the photochromic coating being the outermost coating thereof. The at least one photochromic primer may comprise the polyurethane resin layer disclosed in EP 1 602 479 A1, in particular in EP 1 602 479 A1, claim 1, or the primer layer disclosed in WO 03/058300 A1, in particular in WO 03/058300 A1, page 22, line 3 to page 23, line 13.

Typically, the surface of the at least one hard coating and/or the at least one primer coating is modified, typically after precuring, by contacting with at least one mechanical means.

The surface of at least one photochromic coating or the at least one coating based on a coating composition usually resulting in at least one photochromic coating but not comprising at least one photochromic dye may be either modified, typically after precuring, by contacting with at least one mechanical means or by the method disclosed in EP 3 812 142 A1 by contacting with at least one medium. For the surface modification using the method disclosed in EP 3 812 142 A1 the at least one photochromic coating or the at least one coating based on a coating composition usually resulting in at least one photochromic coating but not comprising at least one photochromic dye is typically cured and/or hardened, i.e., no additional curing and/or hardening step is required.

The at least one medium, according to EP 3 812 142 A1, being able to modify the surface of the at least one photochromic coating or the based on a coating composition usually resulting in at least one photochromic coating but not comprising at least one photochromic dye comprises at least one organic acid. The at least one medium typically comprises at least one organic aliphatic saturated or unsaturated, optionally substituted, monocarboxylic acid. The at least one medium typically comprises at least one organic aliphatic saturated or unsaturated monocarboxylic acid comprising 2 to 22 carbon atoms, typically 3 to 18 carbon atoms. As at least one medium acetic acid, propionic acid, acrylic acid, lactic acid, butyric acid, isobutyric acid, valeric acid, heptanoic acid, caproic acid, caprylic acid, pelargonic acid, myristoleic acid, palmitoleic acid, linoleic acid, alpha linolenic acid, gamma linolenic acid, oleic acid, ricinoleic acid, stearidonic acid, arachidonic acid, eicosapentaenoic acid, docosapentaenoic acid and/or docosahexaenoic acid may be used, for example. Typically, the at least one medium comprises at least one acid selected from the group consisting of acetic acid, lactic acid, butyric acid, caproic acid, caprylic acid, pelargonic acid, inoleic acid, alpha linolenic acid, gamma linolenic acid and oleic acid. More typically, the at least one medium comprises at least one acid selected from the group consisting of lactic acid, caprylic acid and oleic acid. Alternatively or additionally, the at least one medium may comprise a tricarboxylic acid such as citric acid for example or an inorganic acid such as hydrochloric acid for example. As at least one medium one of the before mentioned or any combination thereof may be used. The at least one medium may be used in commercially available grade or commercially available quality or the at least one medium may be used diluted. In case the at least one medium is applied via ink jet printing the viscosity of the at least one medium may have to be adjusted for being printable. Further, in case the at least one medium is applied via ink jet printing, in addition to the at least one specific position and/or the at least one specific region the at least one medium is to be applied and/or to a variation of the parameters for the at least one single electromagnetic pulse to be applied and/or to a variation in the total process duration the ink comprising the at least one medium may be variable as well, for example with respect to the concentration of the at least one medium. So, a large variety of achievable modifications is possible considering all the possibilities for the before mentioned variations.

Alternatively or additionally to a precuring step the composition of the at least one coating may be adapted to increase for example the viscosity of the at least one coating. The at least one coating is typically applied to an uncoated or precoated surface of the lens substrate via a spin coating method or a dip coating method.

In one embodiment of the disclosure, the spectacle lens comprises at least one coating modifiable when contacted with at least one medium according to the method described in EP 3 812 142 A1. The respective surface modification may either comprise the creation of at least one micro lens or the creation of a final optical surface. In the first scenario, the creation of at least one micro lens, the at least one micro lens is typically influencing the peripheral vision only, not impairing the foveal vision. A wearer's foveal vision may be corrected or compensated by the final optical surfaces achieved by a conventional moulding, grinding and/or polishing process. In the second scenario, the final optical surfaces based on the prescribed refractive power needed to correct/compensate a wearer's foveal vision are created by contacting the surface of the at least one coating with at least one medium being able to modify the surface of the at least one coating, i.e., the method disclosed in EP 3 812 142 A1. The method according to EP 3 812 142 A1 further allows to combine both before described scenarios. In case the spectacle lens comprises at least one coating modifiable when contacted with at least one medium according to the method described in EP 3 812 142 A1 and at least one coating whose surface is modifiable when contacted with at least one mechanical means, both methods are applicable for creating the modified final optical surface of the spectacle lens thus offering a large variety of possibilities for modification.

Summarizing, the exemplary embodiments according to the following clauses are particularly typical within the scope of the present disclosure:

Embodiment 1: Method for manufacturing a spectacle lens comprising a lens substrate and at least one coating, the method comprising at least the following steps in the given order:

Providing a lens substrate comprising an uncoated or precoated front surface and an uncoated or precoated back surface, Covering at least one of the surfaces of the lens substrate with at least one coating composition, Drying and/or precuring the at least one coating composition so that the at least one coating composition is not running-off the at least one surface covered therewith, the at least one coating composition typically adapting the surface topography of the adjacent surface underneath, Contacting the at least one surface of the dried and/or precured coating composition with at least one mechanical means, Removing the at least one mechanical means, Curing and/or hardening the at least one coating, Obtaining a spectacle lens comprising a lens substrate and at least one coating, the surface topography of the at least one coating being modified.

Clause 2: Method according to the preceding clause, wherein the at least one coating composition is selected from at least one of the group consisting of at least one primer coating composition, at least one hard coating composition, at least one photochromic composition and at least one composition analogous to the at least one photochromic composition not comprising at least one photochromic dye.

Clause 3: Method according to any one of the preceding clauses, wherein the at least one mechanical means is selected from at least one of the group consisting of at least one contact head, an array of contact heads, a device comprising at least one contact head, at least one needle, an array of needles and/or a device comprising at least one needle.

EXAMPLE 1

An uncoated lens substrate based on polyallyldiglycol carbonate (0 dpt, diameter: 75 mm), coated on both surfaces with the primer precursor material according to example 1 of U.S. Pat. No. 5,316,791 and subsequently with the hard coating composition according to example 2 of EP 2 578 649 A1. The coated lens substrate was first dried with an IR lamp for 5 minutes at 70° C. in ambient air. The surface of the hard coating composition on the front surface of the lens substrate was then contacted with a contact head that has been manually dipped into the hard coating composition and manually pulled off the hard coating composition. Subsequently, the front surface was exposed to an electromagnetic pulse train consisting of 60 electromagnetic pulses within a total process duration of 42 seconds in ambient air. The wavelength of each single electromagnetic pulse was between 200 nm to 1000 nm. Each of the 60 electromagnetic pulses delivered a dose of 5.8 J/cm2. Each of the 60 electromagnetic pulses were divided into 12 micro-pulses at an average duty-cycle of 14%. The envelope of each of the 60 electromagnetic pulses was 126 ms. Both hard coating compositions has been cured, the hard coating on the front surface thereby comprising at each contact point of hard coating composition and contact head a micro lens. One of the micro lenses has had a spherical power of +60 diopters, the other one a spherical power of 39 diopters. The dimensions of the micro lenses has been determined by using the optical profilometer NewView 7100 of Zygo Corporation.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for manufacturing a spectacle lens, the spectacle lens having a lens substrate and at least one coating, the method comprising at least the following steps:

providing a lens substrate having an uncoated or precoated front surface and an uncoated or precoated back surface;

covering at least one of the surfaces of the lens substrate partially or completely with at least one coating composition; and drying and/or precuring the at least one coating composition, wherein the method further comprises at least the following steps:

contacting a surface of the at least one coating composition with at least one mechanical means;

retracting the at least one mechanical means from the surface of the at least one coating composition to locally change a coating thickness at a point of contact between the coating composition and the at least one mechanical means;

curing and/or hardening the at least one coating composition; and obtaining the spectacle lens having the lens substrate and the at least one coating, the surface topography of the at least one coating being modified by the at least one mechanical means at the point of contact, and the modification of the surface topography of the at least one coating resulting in at least one micro lens.

2. The method according to claim 1, wherein the at least one coating composition is selected from of at least one of the group consisting of at least one primer coating composition, at least one hard coating composition, at least one photochromic composition and at least one coating composition analogous to the at least one photochromic composition not comprising at least one photochromic dye.

3. The method according to claim 1, wherein the at least one mechanical means is selected from of at least one of the group consisting of at least one contact head, an array of contact heads, a device containing at least one contact head, at least one needle, an array of needles and/or a device containing the at least one needle.

4. The method according to claim 1, wherein the contacting of the surface of the at least one coating with the at least one mechanical means is performed by touching the surface of the at least one coating with the at least one mechanical means or by dipping the at least one mechanical means into the at least one coating.

5. The method according to claim 1, wherein after the contacting of the surface of the at least one coating with the at least one mechanical means, the at least one mechanical means is removed from the surface or pulled out of the at least one coating.

6. The method according to claim 1, wherein at least a viscosity of the at least one coating, dimensions of the at least one mechanical means, a velocity of removal of the at least one mechanical means, a direction of the removal of the at least one mechanical means, the velocity of the pulling out of the at least one mechanical means and/or the direction of the pulling out of the at least one mechanical means influences the surface topography of the at least one coating.

7. The method according to claim 1, wherein the contacting of the surface of the at least one coating composition with the at least one mechanical means is temporary.

8. The method according to claim 1, wherein the curing and/or hardening of the at least one coating composition is performed by the application of direct heat.

9. The method according to claim 1, wherein the curing and/or hardening of the at least one coating composition is performed by the application of at least one single electromagnetic pulse.

10. The method according to claim 9, wherein the at least one single electromagnetic pulse is be applied from at least one electromagnetic source selected from of at least one of the group consisting of at least one flash lamp, at least one halogen lamp, at least one directed plasma arc, at least one laser, at least one microwave generator, at least one induction heater, at least one electron beam, at least one stroboscope and at least one mercury lamp.

11. The method according to claim 9, wherein a total time needed for curing and/or hardening lies within at least one range selected from the following:
(A) a range from 100 µs to 7 min,
(B) a range from 300 µs to 5 min,
(C) a range from 500 µs to 4 min, and
(D) a range from 1 ms to 3 min.

12. A method for manufacturing a spectacle lens, the spectacle lens having a lens substrate and at least one coating, the method comprising at least the following steps:
providing a lens substrate comprising an uncoated or precoated front surface and an uncoated or precoated back surface;
covering at least one of the surfaces of the lens substrate partially or completely with a least one coating composition; and
drying and/or precuring the at least one coating composition,
the method further comprising at least the following steps:
contacting a surface of the at least one coating composition with at least one mechanical means;
retracting the at least one mechanical means from the surface of the at least one coating composition to locally change a coating thickness at a point of contact between the coating composition and the at least one mechanical means;
curing and/or hardening the at least one coating composition by a) the application of direct heat or by b) (i) the application of at least one single electromagnetic pulse or by b) (ii) the application of single electromagnetic pulses to at least one of the surfaces of the spectacle lens, the spectacle lens containing the lens substrate and the at least one coating; and
obtaining the spectacle lens having the lens substrate and the at least one coating, a surface topography of the at least one coating being modified by the at least one mechanical means at the point of contact.

13. The method according to claim 12, wherein the modification of the surface topography of the at least one coating results in at least one micro lens.

14. The method according to claim 12, wherein the contacting of the surface of the at least one coating composition with the at least one mechanical means is temporary.

15. The method according to claim 12, wherein the contacting of the surface of the at least one coating with the at least one mechanical means is performed by touching the surface of the at least one coating with the at least one mechanical means or by dipping the at least one mechanical means into the at least one coating.

16. The method according to claim 12, wherein after the contacting of the surface of the at least one coating with the at least one mechanical means, the at least one mechanical means is removed from the surface or pulled out of the at least one coating.

17. The method according to claim 12, wherein the at least one coating composition is selected from of at least one of the group consisting of at least one primer coating composition, at least one hard coating composition, at least one photochromic composition, and at least one coating composition analogous to the at least one photochromic composition not comprising at least one photochromic dye.

18. The method according to claim 12, wherein the at least one mechanical means is selected from of at least one of the group consisting of at least one contact head, an array of contact heads, a device including the at least one contact head, at least one needle, an array of needles and/or a device including the at least one needle.

19. The method according to claim 12, wherein a total process duration needed for curing the at least one coating by b) (i) the application of at least one single electromagnetic pulse or by b) (ii) the application of single electromagnetic pulses, lies within a range from 100 µs to 7 min.

20. The method according to claim 12, wherein the at least one single electromagnetic pulse or each single electromagnetic pulse has an envelope in a range from 50 µs to 200 ms.

21. The method according to claim 12, wherein the at least one single electromagnetic pulse or each single electromagnetic pulse comprises light delivered by at least one electromagnetic source selected from of at least one of the group consisting of at least one flash lamp, at least one halogen lamp, at least one directed plasma arc, at least one laser, at least one microwave generator, at least one induction heater, at least one electron beam, at least one stroboscope, and at least one mercury lamp.

22. The method according to claim 12, wherein the at least one single electromagnetic pulse or each single electromagnetic pulse has a wavelength in a range from 100 nm to 1800 nm.

* * * * *

UNITED STATES PATENT AND TRADEMARK OFFICE
CERTIFICATE OF CORRECTION

PATENT NO. : 12,109,770 B2
APPLICATION NO. : 18/304451
DATED : October 8, 2024
INVENTOR(S) : Maximilian Kastner, Michel-René Christmann and Andreu Llobera Adan It is certified that error appears in the above-identified patent and that said Letters Patent is hereby corrected as shown below:

In the Specification

In Column 14, Line 4: change "from 1 W/cm2 to 60 W/cm2" to -- from 1 $W/cm^2$ to 60 $W/cm^2$ --

In Column 18, Line 39: change "AlX₃" to -- $AlX_3$ --

In Column 22, Line 16: change "3-glycidoxymethyl-trimethoxysilane" to -- 3-glycidoxymethyl-trimethoxysilane --

In Column 22, Line 17: change "3-glycidoxyprop yl-dimethylhydroxy" to -- 3-glycidoxypropyl-dimethylhydroxy --

In Column 22, Line 20: change "3-glycidoxypropyl-trimethoxysilane" to -- 3-glycidoxypropyl-trimethoxysilane --

In Column 22, Line 21: change "3-glycidoxypropyldimethoxymethyl-silane" to -- 3-glycidoxypropyldimethoxymethyl-silane --

In Column 22, Line 26: change "3-glycidoxy-propyltriethoxysilane" to -- 3-glycidoxy-propyltriethoxysilane --

In Column 26, Line 54: change "triprop yleneglycol" to -- tripropyleneglycol --

Signed and Sealed this
Tenth Day of December, 2024

Katherine Kelly Vidal
*Director of the United States Patent and Trademark Office*